United States Patent [19]
Kazemzadeh

[11] Patent Number: 5,527,553
[45] Date of Patent: Jun. 18, 1996

[54] UNDER OIL CUTTING PROCESS FOR PET FOOD AND FEED INDUSTRY

[76] Inventor: Massoud Kazemzadeh, 10025 Beard Ave. S., Bloomington, Minn. 55431

[21] Appl. No.: 475,600

[22] Filed: Jun. 7, 1995

[51] Int. Cl.⁶ .................................................. A21C 11/10
[52] U.S. Cl. ........................ 426/302; 426/99; 426/305; 426/307; 426/448; 426/454; 426/516; 426/623; 425/34; 264/142
[58] Field of Search ........................ 426/89, 96, 99, 426/302, 305, 307, 454, 516, 448, 623; 425/311, 315, 67; 264/142, 210.3

[56] References Cited

U.S. PATENT DOCUMENTS 4,606,873  8/1986  Biglione et al. ................. 425/311
4,735,566  4/1988  Squicciarini ..................... 425/312
5,435,713  7/1995  Yamasaki et al. ............... 425/311

Primary Examiner—Esther M. Kepplinger
Assistant Examiner—Lien Tran
Attorney, Agent, or Firm—Merchant, Gould, Smith, Edell, Welter & Schmidt

[57] ABSTRACT

A process for adding fat to an extruded pet food composition using an under oil cutting process wherein the extrudate is simultaneously cut, infused with oil and dried to form food pellets.

5 Claims, 1 Drawing Sheet

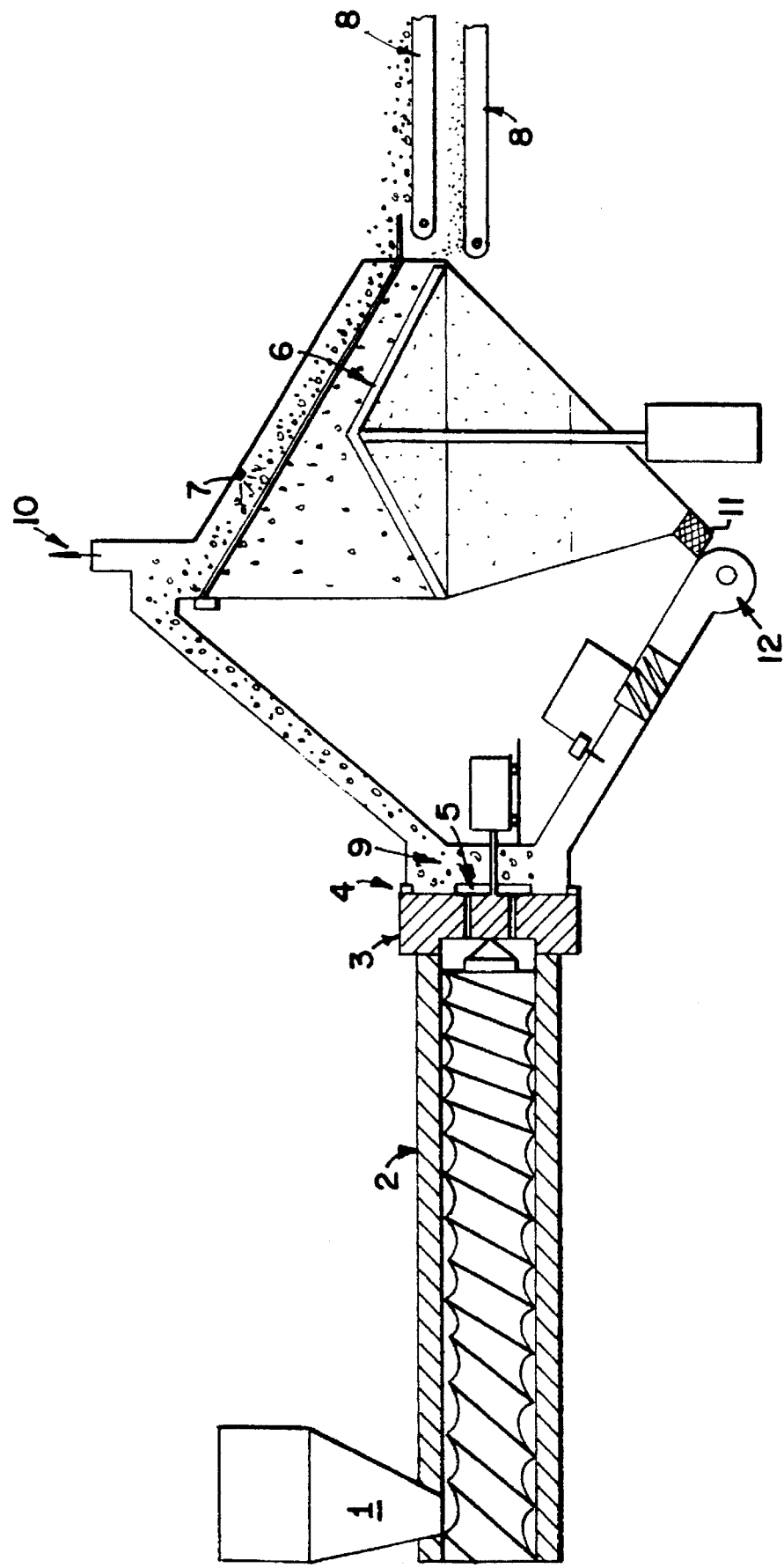

UNDER OIL CUTTING PROCESS FOR PET FOOD AND FEED INDUSTRY

FIELD OF THE INVENTION

The present invention is related to a process for preparing food pellets for animal feed with increased fat levels employing a post-extrusion under oil cutting process.

BACKGROUND OF THE INVENTION

There are several pieces of post-extrusion machinery that are designed to fulfill a specific aspect of extrudate needs. These are very common in the plastic industry, in which the various cutters and take-off systems provide an excellent solution to the specific needs of the extrudate. However, in the food, pet food, and feed industries there is very little developed to meet the needs of the extrudate as it is leaving the die area. These needs include dealing with stickiness, rate of expandability, and high moisture extrudates with needs of special handling and care until the product is dried and solidified. In order to accommodate some of the needs in the food industry, the designs for new types of cutters at the die may vary from use of lasers as cutting devices, to high pressure air cutting which does not subject the product to contact with any materials, to flexible knives and solid, hard, heated knives. Some of these concepts have been tried and are used commonly in plastics, with very few in the food and pet food industries. Some have never found a market or application due to failure of the designs or the weakness of the design in supporting the needs of the product. Variations of material composites of the knives also have been tested, and are used extensively for a given process. The under-oil cutting process of the present invention is based on a process currently in use in the plastics industry, and referred to as underwater cutting.

To accommodate specific design needs of the extrudate, a number of concepts have been developed to support the three dimensional aspects of the extrudate by working with the die design as well as cutting patterns. One idea is the use of short and long knives, one length to partially cut the extrudate while the next set is to cut the extrudate free from the die area. By use of the partial cut, the extrudate may take on a three dimensional phase which can be intriguing to the consumer. Another variation of such a process is to keep the cutter portion consistent and rotate the die area to subject the extrudate to various cutting lengths. Such a cutting technique can result in a rose-like shape with three dimensional petals. Most of the above procedures work the best with products that make use of the vapors under pressure within the extruder and a solid matrix for the bubbles to be formed once the vapor releases the pressure by leaving the die, thus producing expansion in the product while it is being extruded leaving the die.

None of the above processes have focused on the area of the die under which the extrudate is being cut or being introduced to the atmosphere at the moment it leaves the die parameter. At this moment, extrudates, and more specifically the extrudates made up of organic polymers such as cellulose, proteins, sugars, starches and hydrocolloids extruded under high temperatures and pressures (225°–385° F., and 150–1300 psi), are subject to a violent reaction and deformation. On one hand, the gaseous medium within the matrix of the organic polymer is going through a phase change in which the liquid is converted into gas and thus is expanded. At the same time, depending on the temperature of the extrudate, a portion of the gas escapes due to the evaporation from the surface of the extrudate as well as leakage from the inside of the extrudate. The evaporation of the gaseous substance, which in most cases is the water tends, to cool the particulate and, by doing so, reduces the temperature of the particulate. Thus the pellet is expanded and cooled to a point where the temperature of the extrudate no longer provides the necessary energy for the liquid to stay as a gas and the gaseous pressure is not sufficient to overcome the forces of the polymer lining the surface of the bubble. In most instances, organic polymers such as in carbohydrates, starches, proteins or hydrocolloids, where the expansion is taking place due to the release of pressure, there is a certain amount of internal gas exchange with the outside die environment medium, as well as a certain amount of collapse of the expanded extrudate due to cooling and the viscoelastic property of the melted extrudate medium.

The major benefit of the present invention is to meet the needs in the pet food and feed industries for incorporating certain amounts of fat into the precooked extrudate in a manner and to an extent which was not possible by any other means. In the past, methods employed such as spraying oils or fats following extrusion resulted in a maximum of 30% fat content. With today's feed needs to accommodate the requirements of the dairy market which utilizes hormones for higher production of milk, thus necessitating a feed supply containing high protein and high fat for the dairy cattle, as well as market demands for high fat, high carbohydrate feeds for the specialty pet food industry, the present invention has solved these needs by being capable of expanding extrudates up to 90% fat content, if desired.

SUMMARY OF THE INVENTION

The present invention relates to a process of replacing the steam vapors within an extrudate with the fat at the outside of the die area under high temperatures which can fulfill the ingredient requirements needed to meet the demands of today's pet food market. In addition, it is also a process by which the extrudate can be dried at the time of extrusion, thus utilizing and maintaining the temperature of the pellet during the drying step in which the water vapors are replaced. This process also accomplishes the replacement of the micro air bubbles on the surface as well as within the matrix of the food polymer with bubbles filled with oil or fat. This occurs due to the porosity of the matrix while it is hot and not yet set in its structure. The process is different from the frying of an extrudate after it is cut and cooled by having the polymer expand within the hot oil medium before the polymer has set or any component of the polymer has proceeded to crystallize.

Accordingly, the present invention is a method of manufacturing oil-infused food pellets which comprises:

(a) extruding a food nutrient composition to form an extrudate exiting through a die area;

(b) introducing the extrudate into a chamber comprising a cutting means, and transport means, said chamber being filled with a heated oil medium in which the extrudate is insoluble, and wherein the extrudate is oil-infused, cut into pellets, dried and then separated by transport means from the oil medium for finishing.

The desired expanded, i.e., fat enriched, dried pellet is used in the pet food industry as, for example, in animal feed. The main features of the present invention are (1) the design of a cutter chamber and the mechanism by which the extrudate is introduced into a chamber filled with a medium that is temperature-controlled to provide a specific expansion ratio and simultaneously cut with a rotary type knife cutter in order to heat the extrudate; (2) that the chamber is filled with heated oil or similar medium (such as glycerols, low melting polymers, or other such organic materials with low melting points, as defined below) within which the extrudate is insoluble, and using the temperature of the medium to cool or heat the extrudate further after exiting the die area; (3) that there is a cutting mechanism by which the extrudate is pelletized and separated from the die assembly; (4) that the cut extrudate is transported away from the die by the moving or pumping action of the medium; (5) that the medium is then separated from the extrudate and the fines by a sieve-like mechanism whereby the liquid oil is removed by draining away the excess from the pellets and recycling the oil medium back into the heating or cooling area, in which it is brought to the desirable temperature and pumped back into the cavity of the outside of the die and the cutter area; (6) that the medium temperature can be higher or lower than the gaseous temperature within the matrix of the extrudate and (7) that the medium's high temperature can be used to dry the product.

DESCRIPTION OF THE DRAWING

FIG. 1 is a representation of the process of the present invention showing an extruder connected at the die area with the chamber containing the oil medium, cutting means and transport means to complete the finishing process for the pellet manufacture.

DESCRIPTION OF THE PREFERRED EMBODIMENTS

By referring to the drawing, the present process is carried out by first adding a food nutrient composition which comprises known ingredients used in animal foods such as, for example, cellulose polymers, proteins, sugars, starches, hydrocolloids, fats including polymeric derivatives thereof, whole grains, vitamins, minerals, and the like into a hopper (1); the hopper feeds the raw material into a cooking or heating extruder, for example, a Buhler cooker extruder (2) wherein the materials are subjected to high temperatures and pressures, e.g., 225°–385° F. and 150–1300 psi. Certain ingredients of the food nutrient composition may also be added separately and directly to the extruder. The extruded die area may be cooled or heated, ranging in temperatures from 20°–365° F. This may also apply to the last extruder barrel, which will remove energy from the extrudate, and may reduce the temperature of the extrudate at the die to the range of 220° F. to 365° F. The temperature of the extrudate will not necessarily match the extruder die area temperature due to heat, shear history during extrusion. The extrudate may expand in two directions; (1) longitudinally, where the extrudate expands within the die area in the direction of extrusion, and/or; (2) radially, where the extrudate expands in the direction perpendicular in the line of extrusion. As a preferred embodiment, a die design where the longitudinal expansion is kept to a minimum may be used. Under either of the extreme conditions, the extrudate temperature will depend on the temperature history and the extent of shear produced by mechanical energy during extrusion. Therefore, the expansion ratio of the extrudate at the hot oil cutting area will depend on the change in temperature, delta t, between the extrudate and the hot oil medium. The resulting extrudate is then introduced into a heated oil medium directly at the die (3); (4) is a seal between the oil cutter chamber and the die surface. The temperature of the oil can be controlled to further heat the extrudate, thus infusing more of the oil into the pellet and also simultaneously drying the extrudate during the cutting and transport steps described later. The temperature should be higher than the extrusion temperature and may vary anywhere from about 225°–450° F., preferably to about 275°–375° F. The temperature level depends on the amount of oil to be infused in the medium and is a function of the specifications of the pellet to be manufactured in a particular batch process step.

The extrudate is simultaneously cut by a cutting mechanism (5) shown as cutting knives located inside of the chamber of the container and the extrudate is freely transported by the medium out of the area once it has been cut and detached from the die face. The process can be considered as part of the cutting mechanism of the extruder (single screw, twin screw or multi-screw extruder). Following the simultaneous cooling and expansion by the hot oil, the relatively cooled pellets are then transported to a screen (6) by which the excess oil is separated from the pellet and blowing air (7) is applied onto the pellet surface thus enhancing the separation of the oil from the pellet and carrying out additional drying as necessary. At this point, the pellet is rolled down the screen due to screen vibration and is deposited on a conveyor belt (8) which carries the finished pellet to the packaging area (not shown). As the pellet enters the hot oil chamber (9) leaving the die, and the moisture is boiled off and a moisture vapor is mixed with the oil until it is vented out of the system through a vent hole in the top of the screen (10). The oil in the cutting chamber is heated by way of a heating mechanism for the oil (11) and then pumped to the chamber by means of a pump assembly (12).

The oil employed in the present process is such that the extrudate is insoluble. The oil falls within the definition of fats and includes glycerol or a glycerol ester of fatty acid(s): Fats generally are substances of plant and animal origin. Useful fats for the present process are preferably in liquid form, e.g., as vegetable oils, or in liquid form at the temperatures employed.

The glycerol esters are predominantly of the triglyceride type, vegetable oils and fats may also contain some di- and even mono-glycerides. Fatty acid component of fats and vegetable oils encompass the range of fatty acids containing from about 8–22 carbon atoms, primarily in a range of C12 and C18. Although most of the fatty acid content is saturated linear alkanoic acid, some of the fatty acid content may be unsaturated, as exemplified by oleic and linoleic acid. Examples of preferred fats and oils used in the present invention are partially hydrogenated vegetable oil comprising soybean and cottonseed oil mixtures in liquid flake form, partially hydrogenated vegetable oil containing a mixture of palm kernel and coconut oils in liquid form, partially hydrogenated nonvegetable coconut oil in liquid plastic form, partially hydrogenated vegetable oil in liquid flake form comprising a mixture of a palm kernel and cottonseed with lecithin, hydrogenated cottonseed oil, hydrogenated palm oil, hydrogenated soybean oil, hydrogenated vegetable oil in liquid form containing a mixture of rapeseed, cottonseed and soybean oil, partially hydrogenated vegetable oil in paste or margarine type of form which contains a mixture of soybean and cottonseed oils with water, salt, nonfat milk, lecithin, mono and diglycerides, sodium benzoate, artificial color, artificial flavor, vitamin A palmitate, soybean oil, corn oil, coconut oil, mono and diglycerides, ethoxylated mono and diglycerides, polyglycerol esters of fatty acids, and polyglycerol as fatty acids.

The extrudate of the present process is a food nutrient composition extruded as described above and is obtained from recipes used in pet foods prior to oil infusion. The ingredients are preferably a mixture of cellulose polymers, e.g., cellulose, cellulose ethers, hydroxyalkyl celluloses such as hydroxy methyl cellulose, and the like, proteins, e.g., yeast extracts, milk solids, and the like, sugars, e.g., sucrose, glucose, fructose and the like, starches, e.g., corn, potato and the like, hydrocolloids, whole grain, e.g. wheat, oat, corn and the like, and fats such as glycerides, substances of plant and animal origin, as solids, e.g. tallow, lard, butter, margarine or other shortenings or in liquid form as defined below. Fats also include organic polymers such as polyglycerol esters of fatty acids and polyglycerol as fatty acids.

The following is an illustration of the effect of the expansion ratio of an extrudate made of corn flower and water at various temperatures of the oil medium where the mixture was extruded at 295° F. at the die. The results are shown in Table 1 and are basically due to the amount of energy available in the hot oil and the degree of oil/water vapor exchange which occurs in the extrudate, as well as the amount of gaseous material remaining in the extrudate. The expansion ratio is equal to the diameter of the cross section of the final fried extrudate divided by the diameter of the cross section of the die hole size. The bulk density is equal to pounds of finished product in one cubic foot of space.

TABLE 1

| Temp. of Hot Oil Med. | Expansion Ratio | Bulk Density |
| --- | --- | --- |
| 225° F. | 1.24 | 39 |
| 250° F. | 1.75 | 53 |
| 275° F. | 2.215 | 60 |
| 300° F. | 2.0 | 60 |
| 325° F. | 2.25 | 63 |
| 350° F. | 2.65 | 68 |
| 375° F. | 3.15 | 69 |

Due to variations in the size of the extrudate cross section and the approximation of renewed oil available for the heat exchange between the extrudate and the medium, the above results are estimated values and should not be considered as the absolute under all conditions.

We claim:

1. A method of manufacturing oil-infused food pellets which comprises:

(a) extruding a food nutrient composition to form an extrudate exiting through a die area;

(b) introducing the extrudate directly from said die area into a chamber comprising a cutting means, and transport means, said chamber being filled with a heated oil medium in which the extrudate is insoluble, and wherein the extrudate is oil-infused by said heated oil medium, cut into pellets by said cutting means, dried and then separated by said transport means from the oil medium for finishing.

2. The method of claim 1 wherein the food pellets are used for animal feed.

3. The method of claim 1 wherein the temperature of the oil medium is about 225°–450° F.

4. The method of claim 1 wherein the food nutrient composition is extruded at a temperature between about 225°–385° F. and a pressure between about 150–1300 psi.

5. The method of claim 1 wherein the extrudate exiting through the die area may be cooled or heated at a temperature between about 20°–365° F.

\* \* \* \* \*